US010101492B2

(12) United States Patent
Fouda et al.

(10) Patent No.: US 10,101,492 B2
(45) Date of Patent: Oct. 16, 2018

(54) HIGH GAIN ANTENNA FOR PROPAGATION LOGGING TOOLS

(71) Applicant: HALLIBURTON ENERGY SERVICES, INC., Houston, TX (US)

(72) Inventors: Ahmed E. Fouda, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/109,445

(22) PCT Filed: Aug. 15, 2014

(86) PCT No.: PCT/US2014/051328
§ 371 (c)(1),
(2) Date: Jul. 1, 2016

(87) PCT Pub. No.: WO2016/025001
PCT Pub. Date: Feb. 18, 2016

(65) Prior Publication Data
US 2016/0327677 A1    Nov. 10, 2016

(51) Int. Cl.
*G01V 3/10* (2006.01)
*G01V 3/18* (2006.01)
*G01V 3/28* (2006.01)
*G01V 3/26* (2006.01)

(52) U.S. Cl.
CPC . *G01V 3/28* (2013.01); *G01V 3/26* (2013.01)

(58) Field of Classification Search
CPC ... G02B 3/00; G02B 6/32; G01V 3/28; G01V 3/30; E21B 47/12; E21B 49/00
USPC ............ 73/152.55; 250/505.1; 324/324–375; 343/909, 912; 359/237, 238, 278, 641, 359/642, 652, 653, 654, 665, 708; 385/33
See application file for complete search history.

(56) References Cited

U.S. PATENT DOCUMENTS

2006/0145700 A1  7/2006 Tabanou et al.
2009/0273538 A1  11/2009 Smith et al.
2010/0277374 A1  11/2010 Ju et al.
(Continued)

FOREIGN PATENT DOCUMENTS

EP    1693685 A1    8/2006
WO    2013072844    5/2013

OTHER PUBLICATIONS

Pendry, John B., D. Schurig, and David R. Smith. "Controlling electromagnetic fields." Science 312, No. 5781 (2006): 1780-1782.
(Continued)

*Primary Examiner* — Jeff Natalini
*Assistant Examiner* — Steven Yeninas
(74) *Attorney, Agent, or Firm* — Locke Lord LLP

(57) ABSTRACT

The disclosure concerns an electromagnetic logging tool for recording the electromagnetic properties of a subterranean rock formation. One version of the disclosure includes an electromagnetic transmitter that transmits an electromagnetic signal into a downhole formation, an electromagnetic receiver that receives the electromagnetic signal formation; and a cavity antenna in which the interior of the cavity contains a metamaterial made up of a plurality of unit cells that include split ring resonators or other devices such as electric-LC resonators.

21 Claims, 9 Drawing Sheets

(56) References Cited

U.S. PATENT DOCUMENTS

| | | | |
|---|---|---|---|
| 2012/0086843 A1 | 4/2012 | Boybay et al. | |
| 2012/0280872 A1 | 11/2012 | Werner et al. | |
| 2014/0292615 A1* | 10/2014 | Liu | H01Q 15/0086 |
| | | | 343/912 |

OTHER PUBLICATIONS

Pendry, John. "Metamaterials and the control of electromagnetic fields." Conference on coherence and quantum optics. Optical Society of America, 2007.

Kwon, Do-Hoon, and Douglas H. Werner. "Transformation electromagnetics: An overview of the theory and applications." IEEE Antennas and Propagation Magazine 52.1 (2010): 24-46.

Rahm, Marco, et al. "Optical design of reflectionless complex media by finite embedded coordinate transformations." Physical Review Letters 100.6 (2008): 063903.

Schurig, David, et al. "Metamaterial electromagnetic cloak at microwave frequencies." Science 314.5801 (2006): 977-980.

Tichit, Paul-Henri, Shah Nawaz Burokur, and André de Lustrac. "Antenna Design Concepts Based on Transformation Electromagnetics Approach." Radioengineering 21, No. 4 (2012): 955.

Smith, D. R., S. Schultz, P. Markok and C. M. Soukoulis. "Determination of effective permittivity and permeability of metamaterials from reflection and transmission coefficients." Physical Review B 65, No. 19 (2002): 195104.

Wilson, Jeffrey D., and Zachary D. Schwartz. "Multifocal flat lens with left-handed metamaterial." Applied Physics Letters 86, No. 2 (2005): 021113-021113.

Erentok, Aycan, Richard W. Ziolkowski, J. A. Nielsen, R. B. Greegor, C. G. Parazzoli, M. H. Tanielian, Steven A. Cummer et al. "Low frequency lumped elementbased negative index metamaterial." Applied Physics Letters 91, No. 18 (2007): 184104-184104.

Freire, Manuel J., Ricardo Marques, and Lukas Jelinek. "Experimental demonstration of a $\mu=-1$ metamaterial lens for magnetic resonance imaging." Applied Physics Letters 93 (2008): 231108.

Xie, Yihong, Jianfeng Jiang, and Sailing He. "Proposal of cylindrical rolled-up metamaterial lenses for magnetic resonance imaging application and preliminary experimental demonstration." Progress in Electromagnetics Research 124 (2012): 151-162.

Pendry, J. B. "A chiral route to negative refraction." Science 306, No. 5700 (2004): 1353-1355.

Magnus, F., B. Wood, J. Moore, K. Morrison, G. Perkins, J. Fyson, M. C. K. Wiltshire, D. Caplin, L. F. Cohen, and J. B. Pendry. "A dc magnetic metamaterial." Nature materials 7, No. 4 (2008): 295-297.

Gömöry, Fedor, Mykola Solovyov, Ján Šouc, Carles Navau, Jordi Prat-Camps, and Alvaro Sanchez. "Experimental realization of a magnetic cloak." Science 335, No. 6075 (2012): 1466-1468.

Narayana, Supradeep, and Yuki Sato. "DC magnetic cloak." Advanced Materials 24, No. 1 (2012): 71-74.

Jiang, Wei Xiang, Chen Yang Luo, Hui Feng Ma, Zhong Lei Mei, and Tie Jun Cui. "Enhancement of current density by DC electric concentrator." Scientific reports 2 (2012).

Yu, Guan Xia, Li Cao, and Man Zhou. "Design of miniaturization resonant cavities using metamaterial," Central European Journal of Physics 10, No. 1 (2012): 140-144.

Hwang, Chan Yoon, PCT Written Opinion for PCT Application No. PCT/US2014/051328 dated May 15, 2015.

Hwang, Chan Yoon, PCT Search Report for PCT Application No. PCT/US2014/051328 dated May 15, 2015.

EP Extended European Search Report for EP Application No. 14899824.8 dated Jan. 1, 2018.

\* cited by examiner

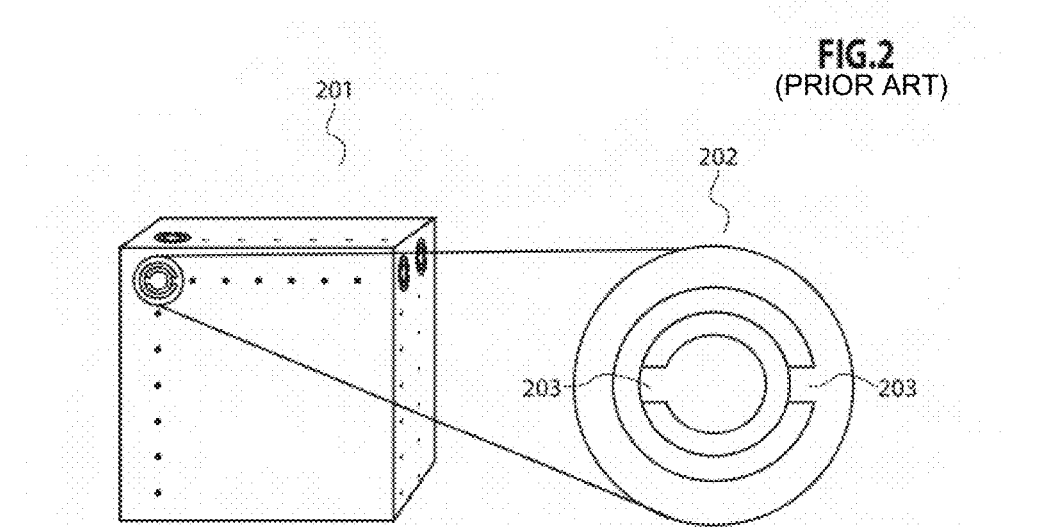
FIG.2
(PRIOR ART)
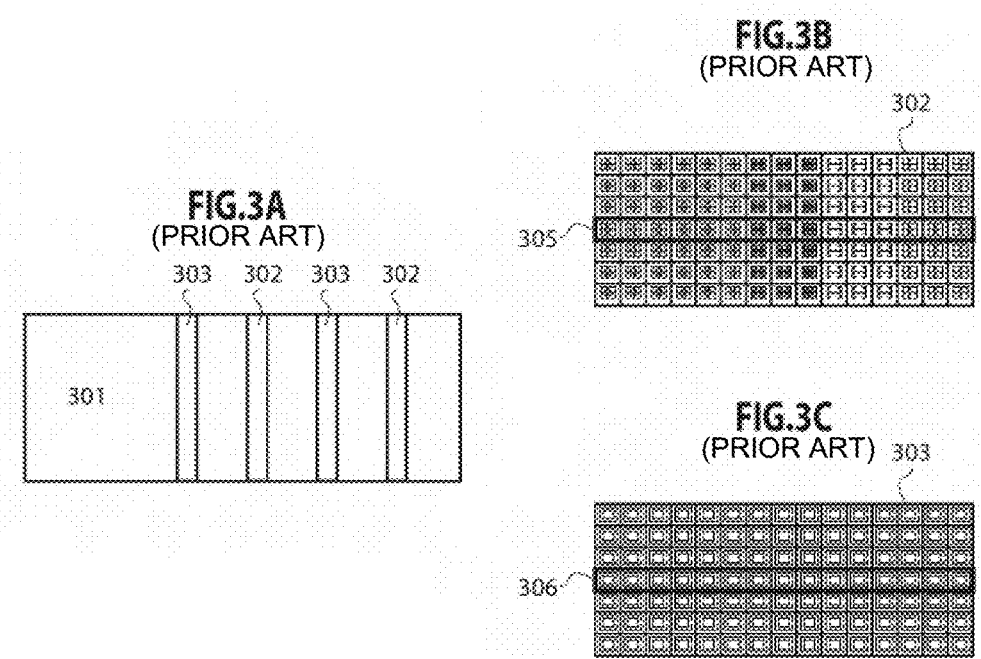
FIG.3A
(PRIOR ART)
FIG.3B
(PRIOR ART)
FIG.3C
(PRIOR ART)

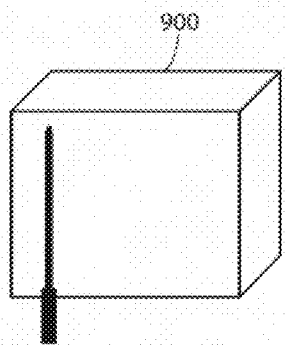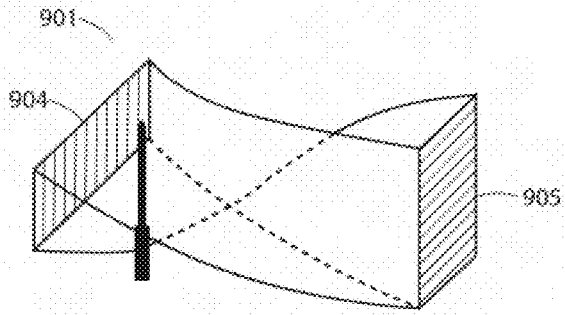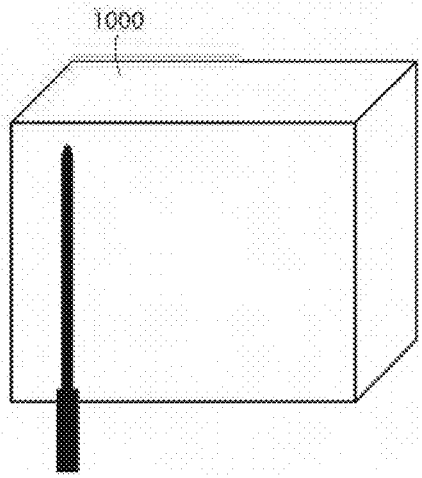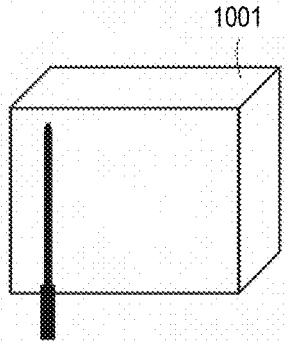

HIGH GAIN ANTENNA FOR PROPAGATION LOGGING TOOLS

TECHNICAL FIELD

The embodiments disclosed herein relate generally to methods and systems for downhole logging in oil and gas wells, and more particularly to antennas used in electromagnetic wellbore logging using metamaterials.

BACKGROUND

Electromagnetic well logging is used in the oil and gas industry. Logging tools to measure the resistivity or conductivity of subterranean earth formations adjacent a borehole in the search for and recovery of hydrocarbons. Generally, a transmitter transmits an electromagnetic signal that passes through the formation around the borehole. These signals then induce a signal in one or more receivers located on the tool. The properties of the signals received after passing through the formation, such as amplitude and/or phase, allow well engineers to make resistivity or other measurements of the formation characteristics. The measurements and formation properties are then recorded as a function of the tool's depth or position in the borehole.

One important electromagnetic measurement is the determination of the dielectric constant of a downhole formation. An example tool for this task is the High Frequency Dielectric Tool ("HFDT") available from Halliburton Corp. The HFDT may be used to measure the apparent dielectric constant and resistivity of a downhole formation and obtain formation properties, such as the water-filled formation porosity. The collection of information relating to conditions downhole, referred to as "logging," can be performed by several methods including wireline logging, logging while drilling ("LWD"), drillpipe conveyed logging, and coil tubing conveyed logging.

In wireline logging, a probe or "sonde" is lowered into the borehole after some or all of the well has been drilled. The sonde is suspended at the end of a cable or "wireline" that provides mechanical support to the sonde and also provides an electrical connection between the sonde and electrical equipment located at the surface of the well. Various parameters of the earth's formations are measured and correlated with the position of the sonde in the borehole as the sonde is pulled uphole.

In LWD, the drilling assembly includes sensing instruments that measure various parameters in the formation as is it being drilled. LWD techniques provide more contemporaneous formation measurements, but the drilling operations create a more difficult operating environment.

In drillpipe or coil tubing conveyed logging, sensing instruments are mounted on a tubing string, which moves the instrument package through an existing borehole. The tubing string enables logging of horizontal well bores without requiring the sensing instruments to tolerate the hostile drilling environment. Typically, the measurement data is stored in internal memory and recovered along with the instrument package.

Dielectric tools determine the dielectric constant and conductivity of downhole formations from the real and imaginary parts of the complex propagation constant of electromagnetic waves traveling through the formations. By measuring the phase difference and amplitude ratio between two points in the formation, the tool determines the formation resistivity and dielectric constant.

To transmit and receive the electromagnetic signals necessary for taking measurements, downhole logging tools use antennas. These antennas may be coils or they may be cavity antennas.

BRIEF DESCRIPTION OF DRAWINGS

FIG. 2 is a diagram illustrating an example of metamaterial unit cell;

FIGS. 3A-3F are diagrams illustrating an example of metamaterial useful in a cavity antenna;

FIG. 9A is a diagram illustrating a rectangular cavity antenna with a metamaterial;

FIG. 9B is a diagram illustrating a virtual cavity antenna with a twisted cavity;

FIGS. 10A-10B are diagrams illustrating examples of rectangular cavity antenna and a larger virtual rectangular cavity antenna.

DETAILED DESCRIPTION OF DISCLOSED EMBODIMENTS

Figure 1:
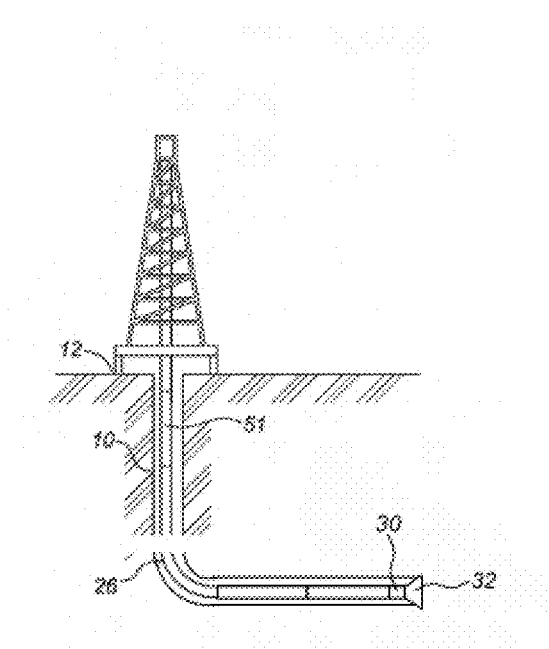
FIG. 1 is an illustration of a drilling rig useful in one or more embodiments.

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the disclosure.

Embodiments of the disclosure concern techniques to control electromagnetic fields in well-logging applications based on transformation optics. FIGS. 1A-1D illustrate the use of transformation optics for controlling an electromagnetic field. FIG. 1A shows an electromagnetic ray 101 depicted in the original space 102 shown as a grid in x-y coordinates. Using transformation optics, the underlying grid 102 may be thought of as being "elastic" and can be deformed to bend the ray 101 according to the shape of the grid, as depicted in FIG. 1B.

Mathematically, transformation optics can be described using Maxwell's equations. In the original space, Maxwell's equations may be written according to the equations:

$$\nabla \times E = -j\omega\mu H$$

$$\nabla \times H = -j\omega \in E + J_S$$

These equations may be transformed according to the following transformation:

x'=x'(x,y,z)
y'=y'(x,y,z)
z'=z'(x,y,z)

where x, y, z constitute a Cartesian coordinate system.

Maxwell's equations are form-invariant under coordinate transformation. In the transformed space, they take the following form:

$$\nabla' \times E' = -j\omega\mu' H'$$

$$\nabla' \times H' = j\omega \in' E' + J'_S$$

where $$\mu' = \frac{A\mu A^T}{|A|}$$

$$\varepsilon' = \frac{A \in A^T}{|A|}$$

$$J'_S = \frac{AJ_s|J_s|}{|AJ_s|}$$

and $$A = \begin{bmatrix} \frac{\partial x'}{\partial x} & \frac{\partial x'}{\partial y} & \frac{\partial x'}{\partial z} \\ \frac{\partial y'}{\partial x} & \frac{\partial y'}{\partial y} & \frac{\partial y'}{\partial z} \\ \frac{\partial z'}{\partial x} & \frac{\partial z'}{\partial y} & \frac{\partial z'}{\partial z} \end{bmatrix}$$

where A is the Jacobian matrix of the transformation. Similar transformations can be conducted in any arbitrary coordinate system.

Due to the form-invariance of Maxwell's equations under coordinate transformation, the above transformations can be interpreted as if the original material within the deformed space is replaced by a generally anisotropic and inhomogeneous material. The transformations above reflect the material properties and the equivalent current source that should be used to realize the prescribed coordinate transformation.

Materials having suitable electromagnetic properties to shape the electromagnetic geometry of a space according to a desired transformation may not necessarily exist in nature. However, such desired transformations may be realized using what may be referred to as "metamaterials." Metamaterials useful in embodiments of the disclosure may be engineered composites that inherit their electrical properties from the geometry and arrangement of their constituting unit cells. Metamaterials can be realized in many different ways depending on the frequency of the electromagnetic radiation they are intended to control. While conventional materials attain their macroscopic properties from the chemical composition of the atoms they are made of, metamaterials attain their macroscopic properties from the design of their constituting unit cells. FIG. 2 illustrates a unit cell 201 useful in one or more embodiments of the disclosure. The unit cell 201 has a cubic geometry. In this embodiment, the cell 201 is internally hollow and is made from a suitable substrate material. The substrate is made of non-conductive materials that are able to withstand the temperatures and pressures they would be exposed to downhole. Metamaterials may, in general, be described by inhomogeneous anisotropic permittivity and permeability tensors.

The outer surfaces of the unit cell 201 are imprinted with one or more electrically conductive split ring resonators ("SRRs") 202. In the embodiment depicted, each SRR 202 comprises a pair of "C-shaped" concentric split rings, with the "split" 203 in each ring arranged 180 degrees apart from each other. The SRRs may be formed from non-magnetic material such as copper. The periodic arrangement of the SRRs on the cell units causes electromagnetic waves to interact as though any material made from these cells was actually a homogeneous material. The SRRs are not limited to the concentric ring shapes depicted and other geometries suitable for SRRs may be used in other embodiments. Each SRR may be designed to have a particular electromagnetic response, depending on the frequency of the electromagnetic waves used to probe the downhole formation by the tool. Thus, design of the SRRs will vary depending on the frequency, or frequencies, of interest to the designer. Each unit cell, and by extension, any structure comprising a plurality of unit cells, will have an electromagnetic response that depends on the SRRs chosen. In some embodiments, the SRRs are uniform throughout the unit cell. In other embodiments, differently sized and/or shaped SRRs are used in a unit cell or in other unit cells comprising a particular structure.

In one embodiment, metamaterials designed using transformation optic rules are iso-impedance, i.e., they have the same intrinsic impedance as the background medium, and therefore, do not introduce spurious reflections, as would be the case with conventional materials. Transformations that preserve grid continuity across the transformed space boundary result in reflectionless, iso-impedance metamaterials.

Another implementation of the disclosure uses a class of transformations called embedded transformations. In embedded transformations, the grid continuity is broken and therefore reflectionless transmission across the metamaterial/background medium interface is not guaranteed. However, embedded transformations provide a higher degree of flexibility for manipulating fields outside the metamaterial device, and can be designed in such a way to minimize spurious reflections.

In addition, metamaterials can be designed to control electromagnetic fields in ways not achievable by conventional materials. Here, metamaterials are designed to optimize the shape of cavities used in dielectric logging tools. In one embodiment, a rectangular cavity is transformed to an equivalent cylindrical cavity using shape-transformation metamaterial filling. In this implementation, cylindrical cavities exhibit wider bandwidth while maintaining the same quality factor. In another embodiment, rectangular cavities filled with polarization rotating metamaterials are designed to approximate twisted cavities with arbitrary twist angles to control the polarization of the output field. Miniaturized cavities may also be filled with space-expanding metamaterials to mimic larger cavities without sacrificing the quality factor of the original cavities.

Figure 3D:
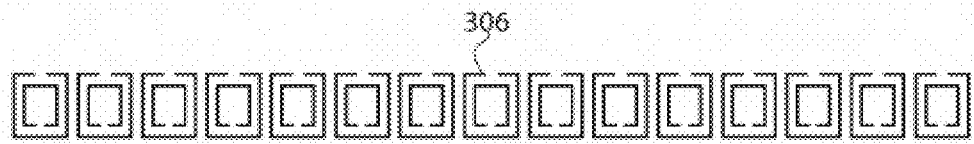
Figure 3E:
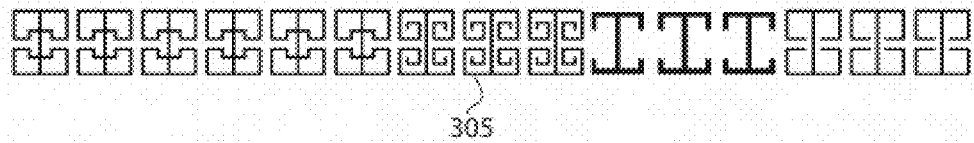
Figure 3F:
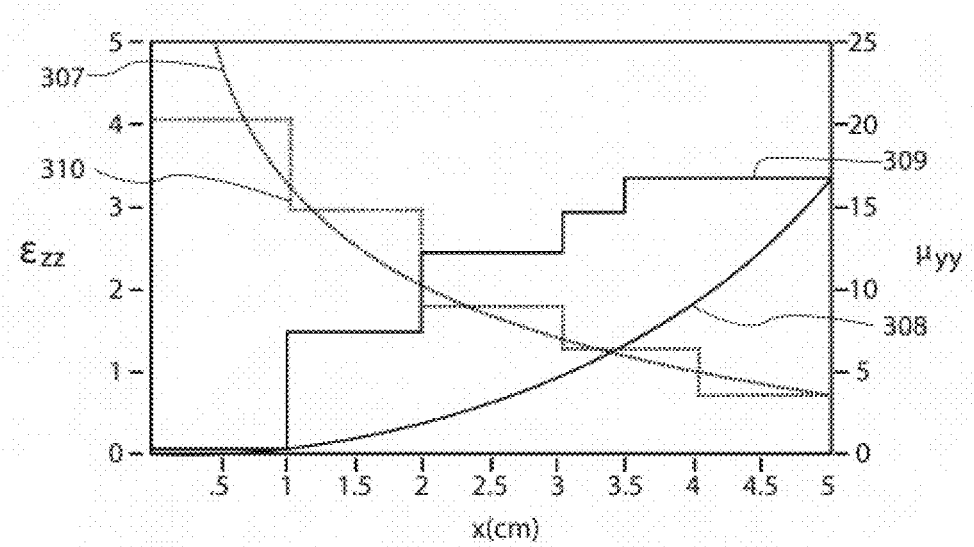

FIG. 3A shows a directive metamaterial ("MM") antenna 301 suitable for use in one or more embodiments of the disclosure. The MM antenna 301 comprises alternating electric and magnetic MM layers, 302 and 303 respectively. FIG. 3B shows an exemplary electric MM layer 302 made using electric-LC resonators. FIG. 3C shows an exemplary magnetic MM layer 303 using SRRs. In this implementation, the MM antenna is designed to approximate the desired electromagnetic profile depicted in FIG. 3F by the smooth curve 308 for $\varepsilon_{zz}$ and curve 307 $\mu_{yy}$, where $\varepsilon_{zz}$ is the z-component of the permittivity tensor, and μyy is the y-component of the permeability tensor. Of course, the desired smooth curves cannot be attained exactly, so the electric MM layers 302 may realize the discretized $\varepsilon_{zz}$ profile 309 using five sets of electric-LC resonators (ELCs) 305, such as those depicted in FIG. 3E, while the magnetic MM layers 303 may realize the discretized $\mu_{yy}$ profile 310 using SRRs 306, such as those shown in FIG. 3D.

In another implementation, transformation optics allows for the shielding of sensitive downhole equipment in a manner similar to so-called invisibility cloaking. FIG. 1C shows a grid 102 transformed to create an enclosure 103 in the inner region ($\rho<R_1$) while maintaining the grid 102 intact in the outer region ($\rho>R_2$). A metamaterial is positioned in the region $R_1<\rho<R_2$ to mimic the grid deformation 104 shown in the figure. The transformation illustrated in FIG. 1C allows rays to be smoothly directed around the inner region 103 regardless of the material content of this inner space, rendering any object placed in the inner space 103 essentially "invisible" to electromagnetic radiation at frequencies responsive to the MM. FIG. 1D shows a three-dimensional view of a set of rays 101 being directed around region 105 created by a MM material inside a downhole tool body 106. Electronic or sensitive components may be arranged in region 105.

Figure 4A:
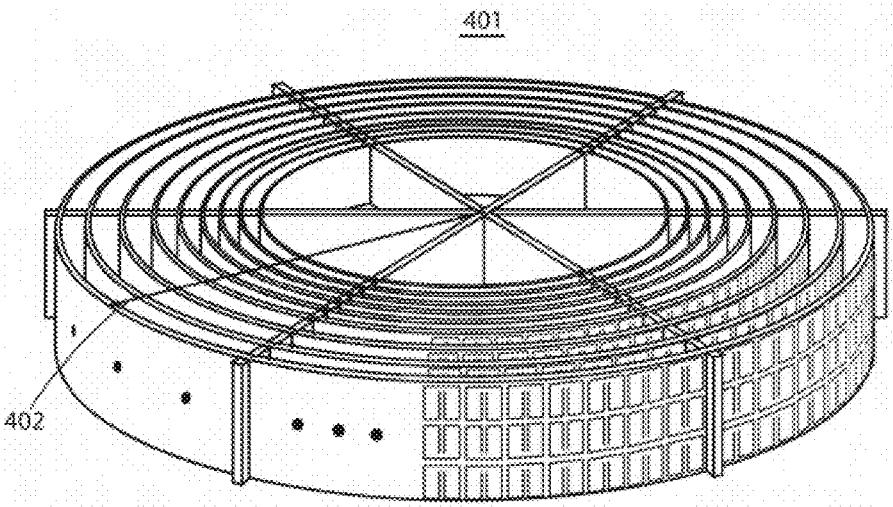
FIGS. 4A-4B are diagrams illustrating an example of metamaterial electromagnetic shield for cloaking.
Figure 4B:
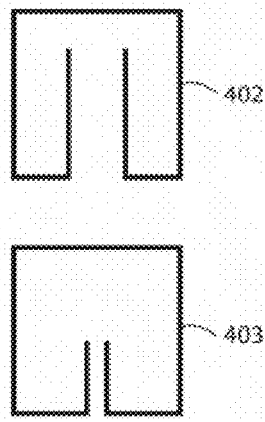

FIG. 4A shows a two-dimensional "invisibility cloak" or shield 401 capable of providing an electromagnetic shield for a downhole tool according to one or more embodiments. The shield 401 is in the shape of a collar and requires the radial component of the permeability tensor ($\mu_{rr}$) to vary radially over the range of, for example, the inner to the outer rings as illustrated in FIG. 4A. This profile is created by using concentric cylinders (ten are shown) with printed split ring resonators (SRRs). The dimensions of the SRRs in each cylinder may be adjusted to achieve the required electromagnetic profile, with different SRRs having different dimensions depending on their location on the shield 401, as depicted by exemplary SRRs 402 and 403 in FIG. 4B. To be able to provide the collection of SRRs with effective macroscopic material properties, the dimension of the unit cell has to be much smaller than the operating wavelength; this is sometimes referred to as the homogenization condition, as generally described in Smith et al, "Determination of Effective Permittivity and Permeability of Metamaterials from Reflection and Transmission Coefficients," Physical Review B 65, No. 19 (2002). Nevertheless, the dimension of the SRR has to be large enough to resonate at or near the operating frequency of the electromagnetic radiation used by the tool to probe the formation. Low frequency of operation in embodiments of downhole tools makes implementing the homogenization principle readily applicable.

In another embodiment, the electromagnetic properties of the downhole tool can be transformed using metamaterials having a negative index of refraction ("NIR"). A negative index material is a metamaterial structure having a refractive index that is negative over a certain frequency range. An NIR lens is an example of embedded transformation optics where double negative (DNG) metamaterials (also known as left-handed (LH) metamaterials) are used. Negative permeability may be realized using SRRs. Negative permittivity may be realized using thin wires.

Figure 5:
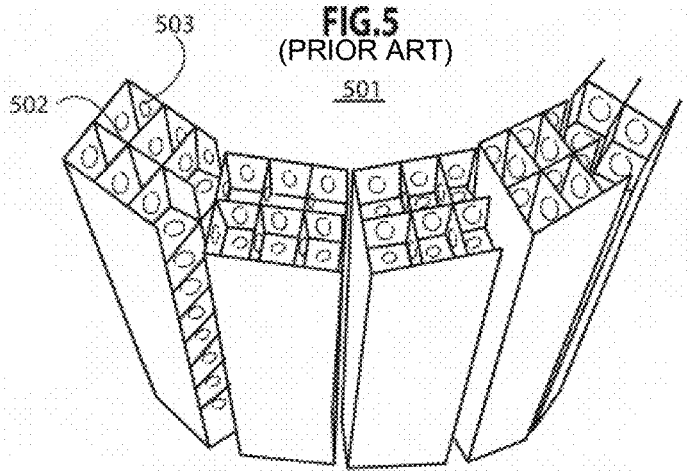
FIG. 5 is a diagram illustrating an example of metamaterial electromagnetic lens.

The dimensions of the SRRs and ELCs required to resonate at lower frequencies become prohibitively large for practical realization. To address this difficulty, lumped components can be used to achieve resonance at lower frequencies without increasing the unit cell dimensions. Example lumped components useful in embodiments may be found in Erentok et al., "Low Frequency Lumped Element Based Negative Index Metamaterial," Applied Physics Letters 91, No. 18 (2007). FIG. 5 shows an example of a cylindrical rolled-up MM lens 501 having a plurality of unit cells 502 arranged adjacently in four columns of 2×3 structures, with the unit cells being provided with split ring capacitors. Similar lenses have been used to enhance the sensitivity and spatial resolution of RF coils in magnetic resonance imaging ("MRI") systems, but may also be adapted to control the electromagnetic fields in well logging applications by using transformation optics in an implementation optimized for the wavelengths at used by the tool, and the physical geometry of the downhole logging tool. Note that since the operating wavelength of MRI RF coils is much larger than the coil's dimensions (quasi-magnetostatics regime), an NIR MM lens can be sufficiently implemented as an SNG lens with $\mu_r=-1$.

Figure 6A:
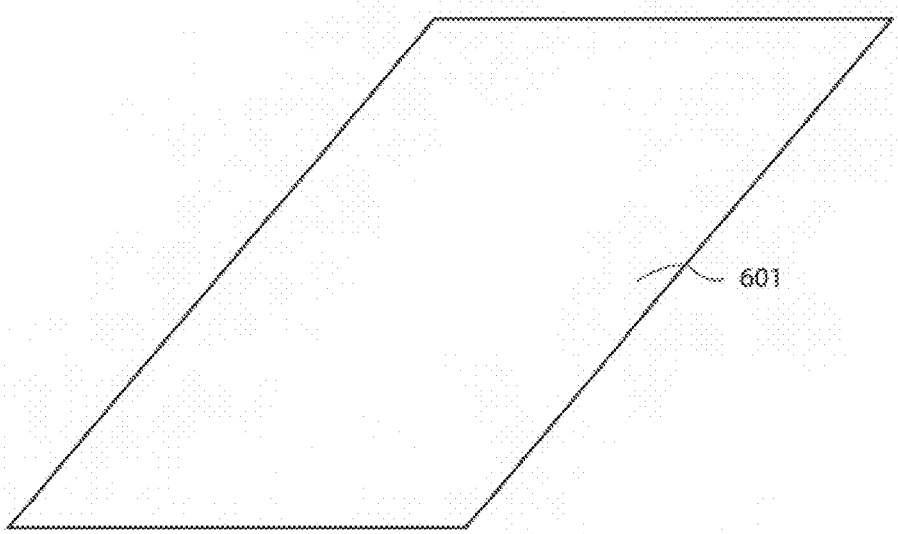
FIGS. 6A-6B are diagrams illustrating an example of chiral metamaterial useful in embodiments.
Figure 6B:
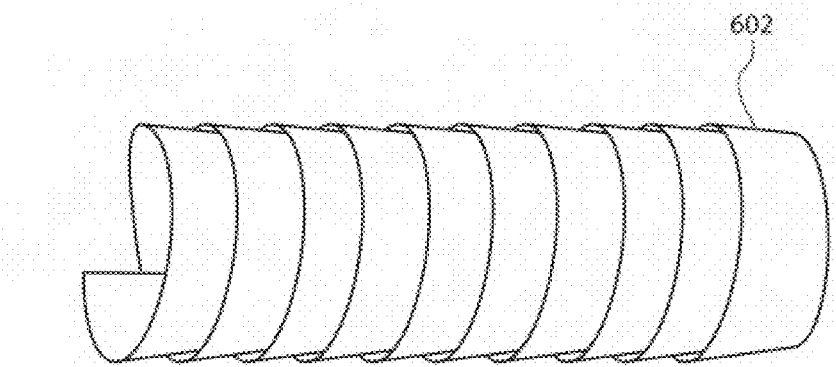

In another embodiment, an alternative design of DNG metamaterials involves chiral materials. As shown in FIGS. 6A-6B, a chiral MM 601 consists of insulated metal strips wound in a helix 602, and then individual helixes are stacked in a 3-D arrangement to form an isotropic DNG structure. This design has the advantage that its unit cells (chiral helixes) can have internal resonances with dimensions in the order of 1/1000th of the operating wavelength. This feature is particularly important for designing MMs operating at very low frequencies (quasi-static MMs).

Some of the MM realization techniques described above rely on resonant structures for operation. This may cause the metamaterial to be highly dispersive and lossy when operated near resonance. This may also mean that a metamaterial with given properties can only be designed to operate at a single frequency. For example, the metamaterial can be implemented as a diamagnetic metamaterial. Example diamagnetic metamaterial may be found in Magnus, "A DC Magnetic Metamaterial," Nature Materials 7, No. 4 (2008). In other embodiments, the metamaterial may be implemented as a DC magnetic cloak. An implementation of an example DC magnetic cloak may be found in Gömöry, "Experimental Realization of a Magnetic Cloak," Science 335, No. 6075 (2012). And, in still further embodiments, the metamaterial may be implemented as a DC electric concentrator. An example DC electric concentrator may be found in Jiang, "Enhancement of Current Density by DC Electric Concentrator," Scientific Reports 2 (2012). In some implementations, the use of metamaterials may be extended to quasi-static and DC applications.

Figure 1A:
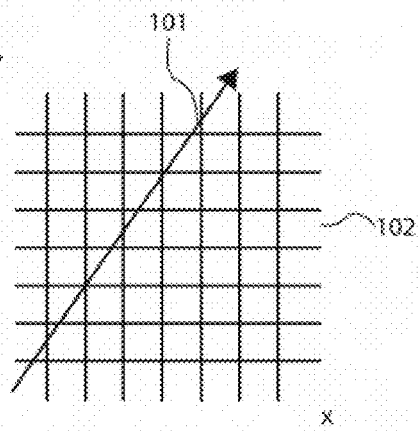
FIGS. 1A-1D are diagrams illustrating transformation optics according to embodiments of this disclosure.
Figure 1B:
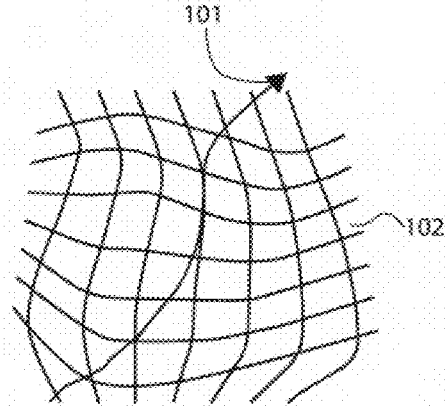
Figure 1C:
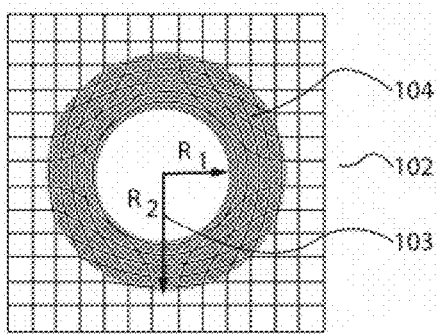
Figure 1D:
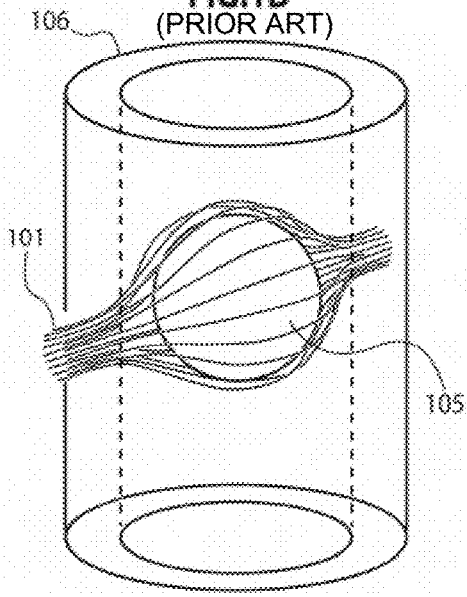

Referring now to FIG. 1, an oil drilling rig is shown for implementing certain aspects of the exemplary embodiments disclosed. The drilling rig may be used to drill a borehole 10 from a surface location 12, which may be a ground surface, a drilling platform, or any other location outside of the borehole 10 from which drilling may be controlled. The drilling rig may have a string 26 suspended therefrom composed of jointed drilling tubing or a continuous length of pipe known as coiled tubing that is made of relatively short pipe sections 51, connected to one another. A wireline or slickline may also be used with the oil drilling rig in order to introduce downhole tools according to one or more embodiments into the wellbore. A wireline or slickline may be mounted on a spool attached to a truck located at the rig site. Exemplary downhole tools may also be lowered into the well bore on drilling tubing. One or more embodiments may be used for purposes such as logging while drilling ("LWD"), or measurement while drilling ("MWD"). The drill string 26 typically has a bottom-hole assembly attached to the end thereof that includes a rotary drilling motor 30 connected to a drill bit 32. Drilling is typically performed using sliding drilling, where the drill bit 32 is rotated by the drilling motor 30 during drilling, but the coiled tubing is not rotated during drilling. The ability to perform sliding drilling, among other things, allows the trajectory of the bit 32 to be controlled to, thereby, drill in an angled direction, relative to the vertical, including a horizontal direction.

According to the present disclosure, metamaterials can be advantageous in well logging electromagnetics for a number of reasons. Metamaterials enable narrow band, single-frequency operation of most tools relevant to this disclosure. Metamaterials accommodate the regular cylindrical geometry of most tools relevant to this disclosure. The generally low operating frequencies of such tools enhance the application of the homogenization condition described above. Furthermore, electric and magnetic fields are decoupled in many tools relevant to this disclosure; this decoupled relationship facilitates the realization of metamaterials using a reduced set of material properties. Another reason that metamaterials can be advantageous in well logging electromagnetics is that the predefined field polarization of most tools relevant to this disclosure facilitates the design of an appropriate metamaterial using a reduced set of parameters. Additionally, if SNG and DNG are not needed, non-resonant, low loss metamaterials operating at wavelengths much longer than the unit cell can be designed.

Figure 7A:
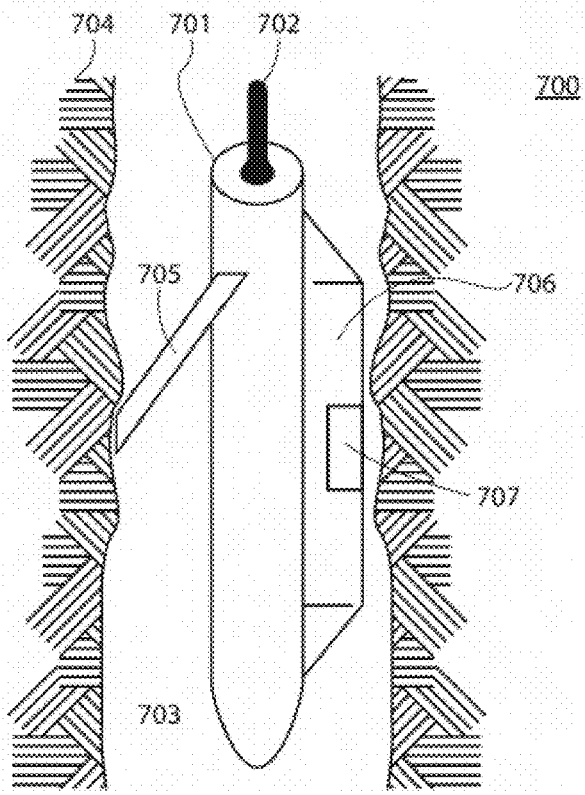
FIG. 7A is a diagram illustrating a dielectric tool having a metamaterial-filled cavity antenna.

FIG. 7A depicts a dielectric tool 700 that includes a tool body 701 suspended from a wireline 702 into a borehole 703. A deployable arm 705 may be extended against a side of the borehole 703 to hold the tool 700 in place and to make contact between a dielectric pad 706 and the formation 704. The tool 700 transmits a continuous electromagnetic wave at a frequency of, for example, 1,000 MHz, into the formation and measures the propagated wave amplitude and phase with respect to the transmitted signal. This allows the tool 700 to measure various properties, such as the complex dielectric constant of the formation 704. The tool 700 is provided with a rectangular cavity antenna 707.

Figure 7B:
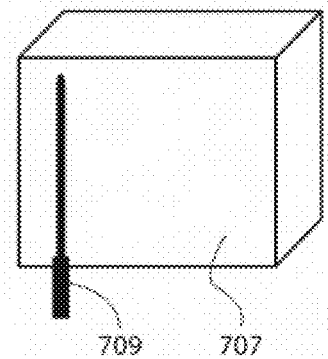
FIG. 7B is a diagram illustrating a rectangular cavity antenna.

FIG. 7B depicts the cavity antenna 707 in more detail, showing its rectangular shape and the placement of feeding probe 709. Different cavity geometries are desirable to achieve certain electromagnetic performance criteria in the logging tool. However, these geometries might be hard to realize in an actual tool suitable for downhole operation.

Figure 7C:
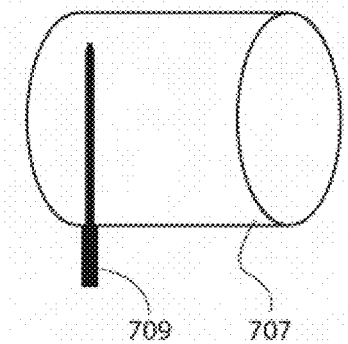
FIG. 7C is a diagram illustrating a virtual cylindrical cavity antenna.
Figure 8A:
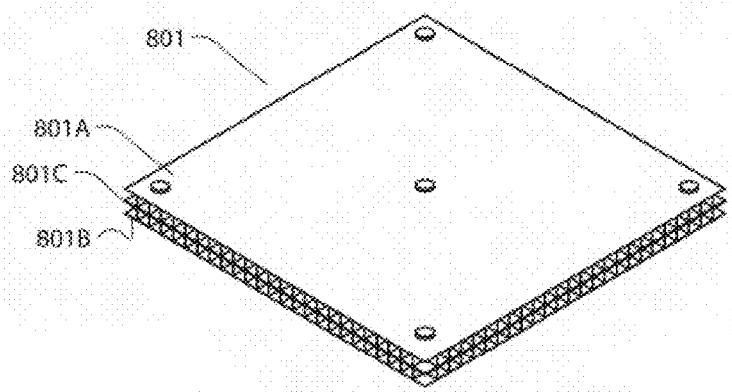
FIGS. 8A-8C are diagrams illustrating examples of metamaterial for use in a cavity antenna according to one or more embodiments of the disclosure.
Figure 8B:
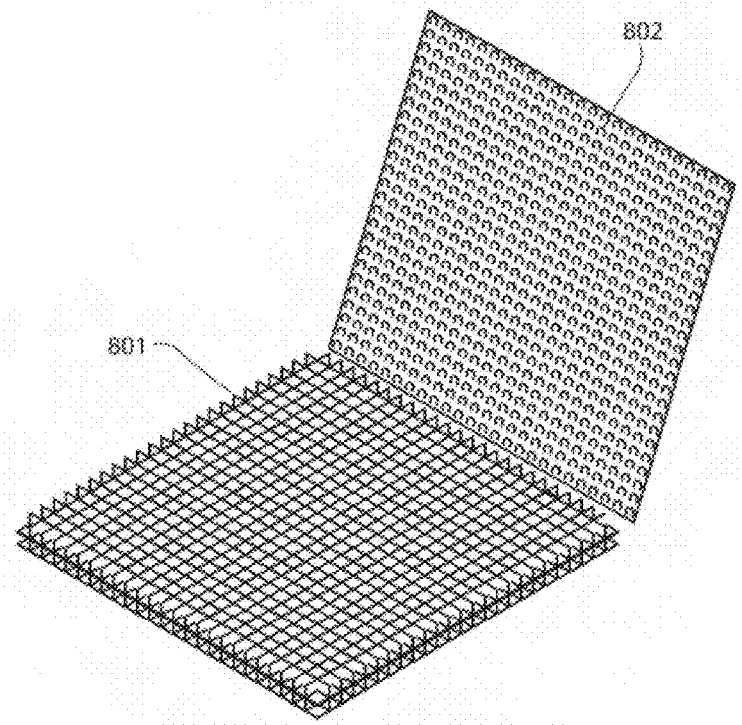
Figure 8C:
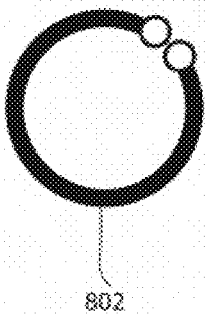

In this embodiment, the shape of the cavity 707 is optimized using a metamaterial filling placed inside cavity 707. The metamaterial may be constructed as illustrated in FIGS. 8A-C. FIG. 8A shows a metamaterial implemented as a rectangular block 801. FIGS. 8A-8B illustrate how the metamaterial may be composed of two or more separate layers 801A-801C stacked together. FIGS. 8B-8C show how the unit cells contain the split ring resonators 802 and how they may be arranged into the unit cells of the metamaterial 801. With reference now to FIGS. 7A-7C, the metamaterial filling may be designed to alter the electromagnetic shape of the cavity 707 so that it appears to have, for example, a cylindrical shape from the standpoint of an electromagnetic wave at the frequency transmitted by the tool 700. FIG. 7C shows the virtual cylindrical shape of the cavity 707 as it would appear to an electromagnetic wave at the frequency used by the tool to scan the rock formation. From the standpoint of transformation optics, both designs are essentially equivalent. The rectangular cavity 707 is filled with shape transformation MM to mimic an equivalent cylindrical cavity as shown in FIG. 7C and achieve a wider bandwidth of electromagnetic operation. Moreover, since the metamaterial is designed according to the conservative transformation optics rules, the quality factor of the original design is preserved.

In another embodiment, a polarization rotating twisted cavity can be realized using a standard rectangular cavity filled with polarization rotating metamaterial, as shown in FIGS. 9A-9B. FIG. 9A shows the physical cavity 900 has a rectangular shape, however, it is filled with a polarization rotating metamaterial according to one or more embodiments. This creates a virtual cavity 901 illustrated in FIG. 9B, which electromagnetically behaves as a twisted cavity. Polarization rotating metamaterial may be used to arbitrarily rotate the polarization, as depicted by polarization lines 904 and 905, of the wave emerging from the cavity of the dielectric tool. This MM breaks grid continuity at the interface, and therefore both actual and virtual cavities are only approximately equivalent. Nevertheless, it allows a tool designer to achieve electromagnetic performance from the cavity without being constrained by the physical geometry of the cavity demanded by other tool design requirements.

FIGS. 10A and 10B illustrate yet another embodiment, in which a large cavity 1000 operating at low frequencies, can be realized using a standard size cavity 1001 filled with space-expanding metamaterial. This cavity miniaturization design keeps the size of the tool manageable even at lower frequencies. In other words, metamaterials may be used to provide miniaturized actual cavities in the tool, yet allow the tool to operate at wavelengths much larger than the cavities' dimensions, and still have the same quality factor as would be found in physically larger cavities. Thus, the smaller physical cavity shown in FIG. 10B has the same electromagnetic performance as though it were the larger virtual cavity shown in FIG. 10A. This is another example of how metamaterials may optimize the virtual shape of the cavity. The advantage of using metamaterials rather than, for instance, high-k dielectrics, is that the former preserves the quality factor of the cavity and adds no spurious distortion, as long as they follow the transformation optics design rules. Example transformation optics design rules may be found in Yu et al., "Design of Miniaturization Resonant Cavities Using Metamaterial," Central European Journal of Physics 10, No. 1 (2012).

In another embodiment of the disclosure, there is provided an electromagnetic logging tool that includes an electromagnetic transmitter that transmits an electromagnetic signal into a downhole formation, an electromagnetic receiver that receives the electromagnetic signal formation; and a cavity antenna wherein the cavity includes a metamaterial. The transmitters and receivers may be any type, such as those used in the HFDT, including coils. The cavity antenna is advantageously rectangular in shape. However, it need not be perfectly rectangular, and the term rectangular as used herein is intended to refer to generally rectangular shapes including horn or trapezoidal antennas. The metamaterial may be of any type in which the electromagnetic properties depend on the nature of the unit cells, which may include split ring resonators or electric-LC resonators ("ELCs").

Another embodiment provides an electromagnetic logging tool that includes an electromagnetic transmitter that transmits an electromagnetic signal into a downhole formation, an electromagnetic receiver that receives the electromagnetic signal formation; and a cavity antenna that is generally rectangular shape and has a metamaterial disposed within the cavity that transforms the generally rectangular cavity into a cavity having virtual shape with respect to electromagnetic radiation at the frequency transmitted by the electromagnetic transmitter. In other words, though the cavity may be physically rectangular, it would appear to an electromagnetic wave as though it had a different shape, with the resulting resonant and other electromagnetic properties, and it would affect the wave accordingly. Of course, the unit cells in the metamaterial will be designed for the frequencies used by the tool.

In some embodiments, the electromagnetic logging tool may further comprise any one of the following features individually or any two or more of these features in combination: (a) an electromagnetic logging tool wherein the transmitter is inside the cavity; (b) wherein the receiver is inside the cavity; (c) wherein the transmitter may be inside the metamaterial; (d) wherein the receiver may be inside the metamaterial; (e) wherein the cavity antenna is a resonant antenna; (f) wherein the metamaterial comprises a plurality of unit cells including split ring resonators; (g) wherein the metamaterial comprises a plurality of unit cells including electric-LC resonators or thin wires; (h) wherein the metamaterial comprises an electric layer which influences the electric field of the electromagnetic signal using a plurality of electric-LC resonators or thin wires, and a magnetic layer which influences the magnetic field of the electromagnetic signal using a plurality of split ring resonators; (i) wherein the metamaterial comprises a chiral material; (j) wherein the metamaterial comprises a polarization rotating material.

In some embodiments, the electromagnetic logging tool may further comprise any one of the following features individually or any two or more of these features in combination: (a) an electromagnetic transmitter that transmits an electromagnetic signal into a downhole formation; (b) an electromagnetic receiver that receives the electromagnetic signal formation; (c) a cavity antenna having a rectangular shape and including a metamaterial within the cavity that transforms the rectangular cavity into a cavity having virtual shape with respect to electromagnetic radiation at the frequency transmitted by the electromagnetic transmitter. (d) an electromagnetic logging tool wherein the virtual shape is cylindrical; (e) an electromagnetic logging tool wherein the virtual shape is a twisted cavity that changes the polarization of the electromagnetic radiation; (f) an electromagnetic logging tool wherein the virtual shape is a rectangular cavity that reproduces at least one electromagnetic property that would be produced by a physical rectangular cavity that is larger than the physical rectangular cavity in the tool in at least one dimension.

In still a further embodiment, the disclosure provides a method for downhole electromagnetic logging that includes positioning an electromagnetic logging tool in a borehole, sending an electromagnetic signal through a subterranean formation adjacent the borehole, and passing the electromagnetic signal through a metamaterial inside the cavity of the antenna of the tool. This allows the metamaterial to control the electromagnetic fields in the well logging tool, for example, to increase the bandwidth while maintaining the same quality factor presented by the actual antenna cavity.

In some embodiments, the method may further comprise any one of the following features individually or any two or more of these features in combination: (a) passing the electromagnetic signal through a plurality of unit cells including split ring resonators; (b) passing the electromagnetic signal through a metamaterial inside the cavity comprises passing the electromagnetic signal through a plurality of unit cells including electric-LC resonators; (c) passing the electromagnetic signal through a metamaterial inside the cavity comprises passing the electromagnetic signal through an electric layer which influences the electric field of the electromagnetic signal using a plurality of electric-LC resonators, and through a magnetic layer which influences the magnetic field of the electromagnetic signal using a plurality of split ring resonators; (d) passing the electromagnetic signal through a metamaterial inside the cavity comprises passing the electromagnetic signal through a chiral material; (e) passing the electromagnetic signal through a metamaterial inside the cavity comprises passing the electromagnetic signal through a polarization rotating material; (f) passing the electromagnetic signal through a metamaterial inside the cavity passing the electromagnetic signal through a metamaterial that has substantially the same intrinsic impedance as the background material of the cavity.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claims.

What is claimed is:

1. An electromagnetic logging tool comprising:
   an electromagnetic transmitter that transmits-an electromagnetic signal into a downhole formation;
   an electromagnetic receiver that receives a resulting electromagnetic signal from the downhole formation;
   a cavity electromagnetically coupled to the transmitter or the receiver, or both, to form a cavity antenna having a physical geometry; and
   a metamaterial filling the cavity, wherein the metamaterial electromagnetically transforms the physical geometry of the cavity antenna into a virtual geometry that is electromagnetically different from the physical geometry.

2. The electromagnetic logging tool according to claim 1, wherein the metamaterial comprises a plurality of unit cells.

3. The electromagnetic logging tool according to claim 2, wherein the transmitter is inside the metamaterial.

4. The electromagnetic logging tool according to claim 2, wherein the receiver is inside the metamaterial.

5. The electromagnetic logging tool according to claim 1, wherein the receiver is inside the cavity.

6. The electromagnetic logging tool according to claim 1, wherein the cavity antenna is a resonant antenna.

7. The electromagnetic logging tool according to claim 1, wherein the metamaterial comprises at least one of a plurality of unit cells including split ring resonators, a plurality of unit cells including electric-LC resonators or thin wires, a chiral material, a polarization rotating material, a shape changing material, or a size changing material.

8. The electromagnetic logging tool according to claim 1, wherein the metamaterial comprises an electric layer which influences the electric field of the electromagnetic signal using a plurality of electric-LC resonators or thin wires, and a magnetic layer which influences the magnetic field of the electromagnetic signal using a plurality of split ring resonators.

9. The electromagnetic logging tool according to claim 1, wherein the metamaterial has substantially the same intrinsic impedance as the background material of the cavity.

10. An electromagnetic logging tool comprising:
an electromagnetic transmitter that transmits an electromagnetic signal into a downhole formation;
an electromagnetic receiver that receives a resulting electromagnetic signal from the downhole formation; and
a cavity electromagnetically coupled to the transmitter or the receiver, or both, to form a cavity antenna having a rectangular shape and including a metamaterial filling the cavity, wherein the metamaterial transforms the rectangular shape into a virtual shape with respect to electromagnetic radiation at a frequency transmitted by the electromagnetic transmitter.

11. The electromagnetic logging tool according to claim 10, wherein the virtual shape is cylindrical.

12. The electromagnetic logging tool according to claim 10, wherein the virtual shape is a twisted cavity that changes the polarization of the electromagnetic radiation.

13. The electromagnetic logging tool according to claim 10, wherein the virtual shape is a rectangular cavity that reproduces at least one electromagnetic property that would be produced by a physical rectangular cavity that is larger than the physical rectangular cavity in the tool in at least one dimension.

14. The electromagnetic logging tool according to claim 13, wherein the at least one electromagnetic property is the resonant frequency.

15. A method for downhole electromagnetic logging comprising:
positioning an electromagnetic logging tool in a borehole;
sending an electromagnetic signal through a subterranean formation adjacent the borehole; and
passing the electromagnetic signal through a metamaterial filling a cavity of at least one cavity antenna of the tool, wherein the metamaterial electromagnetically transforms the physical geometry of the cavity antenna into a virtual geometry that is electromagnetically different from the physical geometry.

16. The method according to claim 15, wherein passing the electromagnetic signal through the metamaterial filling the cavity comprises passing the electromagnetic signal through at least one of a plurality of unit cells including split ring resonators or a plurality of unit cells including electric-LC resonators.

17. The method according to claim 16, wherein passing the electromagnetic signal through a metamaterial filling the cavity comprises passing the electromagnetic signal through an electric layer which influences the electric field of the electromagnetic signal using a plurality of electric-LC resonators, and through a magnetic layer which influences the magnetic field of the electromagnetic signal using a plurality of split ring resonators.

18. The method according to claim 16, wherein passing the electromagnetic signal through a metamaterial filling the cavity comprises passing the electromagnetic signal through a chiral material.

19. The method according to claim 16, wherein passing the electromagnetic signal through a metamaterial filling the cavity comprises passing the electromagnetic signal through a polarization rotating material.

20. The method according to claim 16, wherein passing the electromagnetic signal through a metamaterial filling the cavity passing the electromagnetic signal through a metamaterial that has substantially the same intrinsic impedance as the background material of the cavity.

21. An electromagnetic logging tool comprising:
an electromagnetic probe;
a cavity electromagnetically coupled to and surrounding the electromagnetic probe to form a cavity antenna having a physical geometry; and
a metamaterial filling the cavity such that the metamaterial has the physical geometry of the cavity antenna;
wherein the metamaterial electromagnetically transforms the physical geometry of the cavity antenna into a virtual geometry that is electromagnetically different from the physical geometry.

* * * * *